July 23, 1929.  F. W. BROOKS, SR  1,721,585
ELECTRIC CURRENT DISTRIBUTOR
Filed July 25, 1927  2 Sheets-Sheet 1
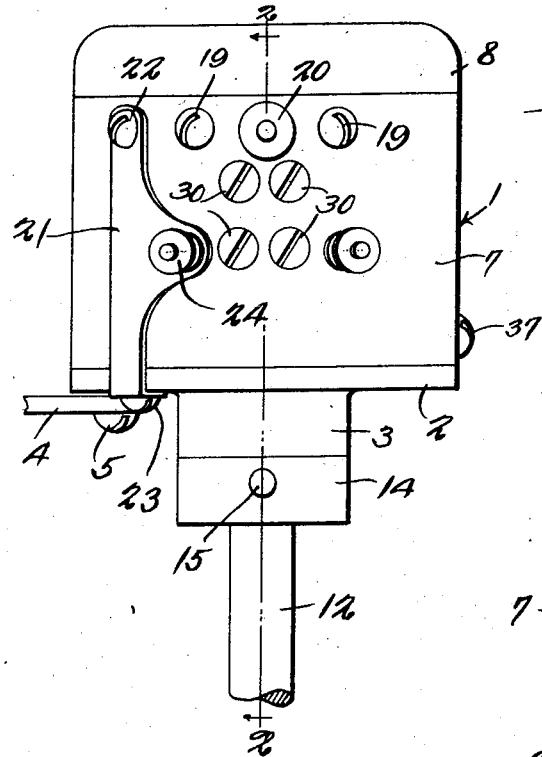
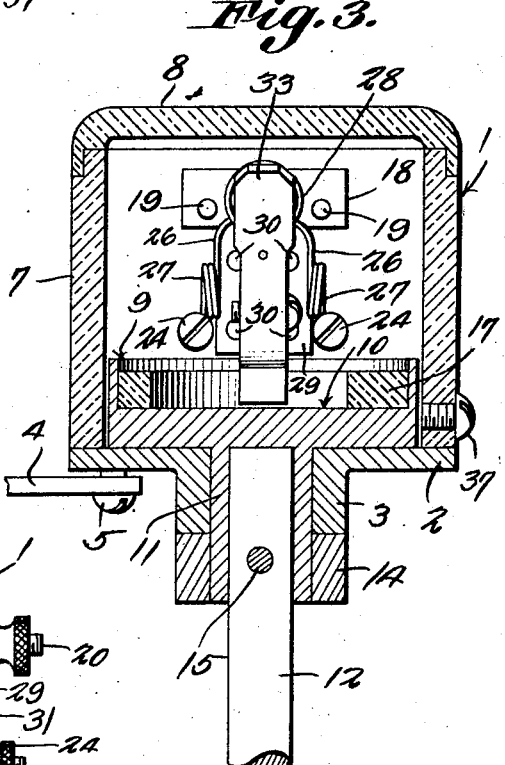
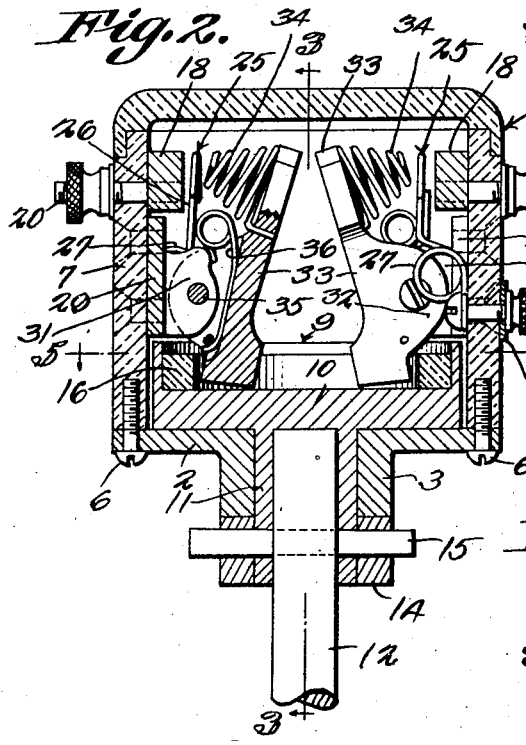
F. W. Brooks, Sr. Inventor

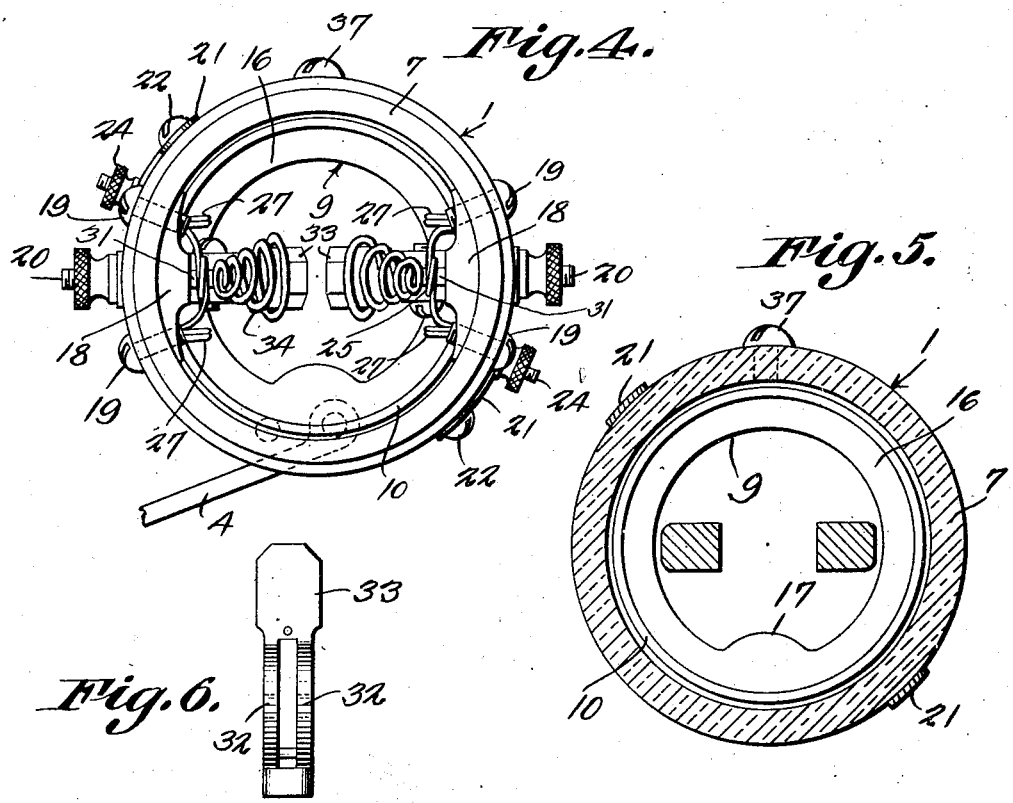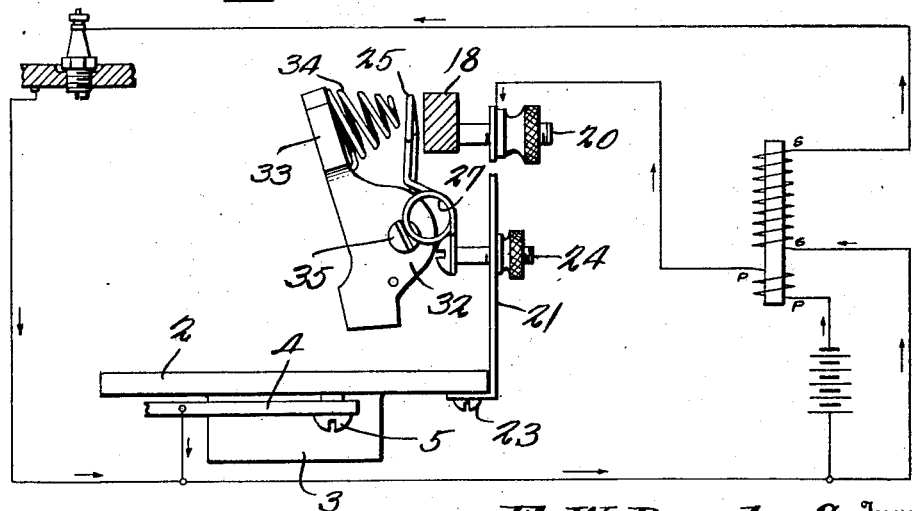

Patented July 23, 1929.

1,721,585

UNITED STATES PATENT OFFICE.

FREDERICK W. BROOKS, SR., OF VIRGINIA, MINNESOTA.

ELECTRIC-CURRENT DISTRIBUTOR.

Application filed July 25, 1927. Serial No. 208,374.

This invention aims to provide a novel distributor or timer for internal combustion engines, and for other purposes, the device being simple in construction, and novel means being provided for operating the switch members.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in elevation, a device constructed in accordance with the invention;

Figure 2 is a section on the line 2—2 of Figure 1;

Figure 3 is a section on the line 3—3 of Figure 2;

Figure 4 is a top plan of the device, the cover having been removed;

Figure 5 is a cross section on the line 5—5 of Figure 2, parts being left in elevation;

Figure 6 is an elevation disclosing one of the switch levers;

Figure 7 is a diagram illustrating one way in which the device may be used.

The device forming the subject matter of this application comprises a casing which is denoted generally by the numeral 1. The casing 1 comprises a metal base 2 having a reduced neck 3. The casing 1 is held against rotation with the shaft, but is rotated by hand, to change the timing, by any suitable means 4, here disclosed as a rod which is pivoted at 5 to the base 2 of the casing. Securing elements 6 hold the tubular body 7 of the casing 1 on the base 2, the body being formed of insulating material, as is the lid 8 which rests upon and closes the body 7. Within the casing 1 is rotated a rotor 9, the rotor including a cup-shaped body resting on the base 2 of the casing 1, the body 10 preferably being made of metal and being provided with a tubular extension 11 prolonged through the neck 3 of the casing 1. A shaft 12 extends into the member 11. The exposed end of the member 11 is surrounded by a collar 14, a securing element 15 connecting the shaft 12, the extension 11 of the rotor 9, and the collar 14, the construction being such that the rotor will be secured in the casing 1, for rotation along with the shaft 12. The cup-shaped body 10 of the rotor 9 may contain oil, if desired, for the lubrication of divers moving parts hereinafter mentioned. A track 16, made of insulating material, is secured within the body 10, the track having a cam 17 which projects toward the axis of rotation of the rotor 9, as Figure 5 will show.

Metal switch terminals 18 are located within the body 7 of the casing 1, near to the upper end of the casing, and are attached to the body 7 by means of securing members 19. Binding posts 20 are secured to the switch terminals 18 and are accessible from the outside of the body 7. Conducting strips 21 are located on the outer surface of the body 7 and are held upon the body by securing elements 22. The strips 21 extend beneath the base 2 of the casing 1, and are secured, as shown at 23. Binding posts 24, accessible from the outside of the casing 1, are extended through the strips 21 and through the body 7. The binding posts 24 hold flexible conducting members 25 on the inner surface of the body 7. The flexible resilient conducting members preferably are made out of wire and include arms 26 formed into helical springs 27, the ends of the springs 27 being engaged immediately with the binding posts 24. The arms 26 of the spring 27 merge into a loop-shaped head 28 which is so located that when it is pressed outwardly by a means to be described hereinafter, it will come into contact with the switch terminal 18.

Brackets 29 are attached by securing elements 30 to the inner surface of the body 7 and are provided with reduced fins 31 extending between the flanges 32 of switch levers 33, pivot elements connecting the flanges of the switch levers with the fins of the brackets, the switch levers, thus, being fulcrumed intermediate their ends on the pivot elements 35. Conical springs 36 are secured to the outer ends of the switch levers 33 and are adapted to engage the flexible conducting members 25. The lower or inner ends of the switch levers 33 are pressed outwardly against the inner edge of the annular cam track 16 of the rotor 9 by the springs 36, engaged with the levers 33 and with the fins of the brackets 29, as shown clearly in Figure 2 of the drawings. It will be understood that there may be as many or as few of the switch levers 33 and attendant parts as occasion may require. In the present instance, but two levers are shown, in order to avoid confusion in the drawings, there being no novelty in mere duplication, and a mechanic being quite competent to add as many switch levers as may be considered expedient, provided that he is instructed by the present disclosure. In the lower portion of the tubular body 7, a drain plug 37 may be mounted, as shown clearly in Figure 3.

When the shaft 12 is turned, rotation is imparted to the rotor 9, and the cam 17 tilts the levers 33 one at a time, the springs 34 being brought into contact with the heads 28 of the flexible conducting members 25, and the conducting members being pressed into engagement with the switch terminals 18. The circuit through the timer may include the operating means shown at 4, the pivot element 5, the base 2 of the casing 1, the strip 21, the binding post 24, the flexible or resilient conducting member 25, the switch terminal 18, and the binding post 20. Figure 7 shows one circuit or method of application for the device forming the subject matter of this application. The wiring of Figure 7 is so clearly understood by those skilled in the art that no time and space will be consumed in a description of it, especially in view of the fact that the user will wire up the device as occasion may require.

When the rotor 9 has been turned far enough so that the lower or inner end of the lever 33 has ridden off the cam 17, under the action of the spring 36, the pressure of the spring 34 on the resilient conducting member 25 is released, the conducting member 25 springs away from the switch terminal 18, and the circuit through the machine is opened at 18—25, as clearly shown in Figure 2 of the drawings.

What is claimed is:—

1. In a device of the class described, a casing, a rotor mounted to turn in one end of the casing, a ring carried by the rotor and having an internal cam, a switch lever fulcrumed intermediate its ends on the side wall of the casing for swinging movement in a direction substantially parallel to the axis of rotation of the rotor, one end of the lever being disposed within the ring, means for holding said end of the lever yieldably in the path of the cam, and a circuit-closing means operated by the opposite end of the lever.

2. In a device of the class described, a cup shaped casing, a switch terminal carried by the side wall of the casing and located within the casing, a spring conducting member supported within the casing and yieldably spaced from the switch terminal, means external to the casing for including the terminal and the conducting member in an electrical support, a rigid lever fulcrumed within the casing, a spring carried by the lever and so located as to engage the conducting member and close it on the terminal when the lever is tilted, means for insulating the lever, a rotor journaled in the casing, and means carried by the rotor for tilting the lever to cause the conducting member to close on the terminal through the instrumentality of the spring on the lever.

In testimony that I claim the foregoing as my own, I have hereto affixed my signature.

FREDERICK W. BROOKS, Sr.